United States Patent [19]
Dilling et al.

[11] Patent Number: 5,366,237
[45] Date of Patent: Nov. 22, 1994

[54] AXLE SUSPENSION SYSTEMS

[75] Inventors: Scott Dilling; Michael J. Keeler; John Ramsey, all of Canton; Joseph M. Ross, North Canton, all of Ohio

[73] Assignee: The Boler Company, Itasca, Ill.

[21] Appl. No.: 230,136

[22] Filed: Apr. 20, 1994

Related U.S. Application Data

[63] Continuation of Ser. No. 963,450, Oct. 19, 1992, abandoned.

[51] Int. Cl.$^5$ .............................................. B60G 11/26
[52] U.S. Cl. ..................................... 280/711; 280/713
[58] Field of Search ............... 280/711, 712, 713, 725, 280/683

[56] References Cited

U.S. PATENT DOCUMENTS

| | | | |
|---|---|---|---|
| 2,613,954 | 10/1952 | Avila | 280/679 |
| 3,140,880 | 7/1964 | Masser | 280/713 |
| 3,332,701 | 7/1967 | Masser | 280/713 |
| 3,482,854 | 12/1969 | Masser | 280/713 |
| 3,547,215 | 12/1970 | Bird | 280/689 |
| 3,612,572 | 10/1971 | Raidel | 280/710 |
| 3,751,066 | 8/1973 | Narahari | 280/712 |
| 3,785,673 | 1/1974 | Harbers | 280/712 |
| 3,918,738 | 11/1975 | Raidel | 280/688 |
| 4,033,609 | 7/1977 | Malcolm | 280/218 |
| 4,065,153 | 12/1977 | Pringle | 280/704 |
| 4,114,923 | 9/1978 | Raidel | 280/711 |
| 4,132,432 | 1/1979 | Raidel | 280/711 |
| 4,166,640 | 9/1979 | VanDenberg | 280/711 |
| 4,878,691 | 11/1989 | Cooper et al. | 280/711 |
| 5,037,126 | 8/1991 | Gottschalk | 280/688 |
| 5,112,078 | 5/1992 | Galazin et al. | 280/711 |

FOREIGN PATENT DOCUMENTS

| | | |
|---|---|---|
| 0458665 | 11/1991 | European Pat. Off. . |
| 2545422 | 11/1984 | France . |
| 1933469 | 2/1966 | Germany . |
| 3119022 | 5/1981 | Germany . |
| 63-046913 | 2/1988 | Japan . |
| WO9204197 | 3/1992 | WIPO . |

OTHER PUBLICATIONS

Daytonair Truckmaster Suspension Brochure (Prior Art).
Eaton Axle and Brake Brochure and Information-1989.
Fruehauf Cargo Care and Pro Par Suspension Brochure (Prior Art).
GMC Astro-Air Suspension Brochure and Information (Prior Art).
HT Series Suspension Brochure (Prior Art).
Hutchens & Sons Suspensions Brochure (Prior Art).
Stablaire Suspension Brochure (Prior Art).
Western Unit Air Suspension Brochure (Prior Art).
Japan Abstracts vol. 12, No. 262, 22 Jul. 1988.

*Primary Examiner*—Brian L. Johnson
*Assistant Examiner*—Paul N. Dickson
*Attorney, Agent, or Firm*—Myers, Liniak & Berenato

[57] ABSTRACT

A beam-type axle suspension system particularly applicable to trailers and which is subject to torsional forces includes an elongated beam, a pneumatic bellows located on the beam, a hanger bracket located at one end of the beam, a connection for rigidly connecting the beam to the axle and a resilient pivot connection for resiliently connecting the beam to the hanger bracket wherein the beam includes an orifice through which the axle is slid or pressed and rigidly attached thereto, thereby preventing the axle from assuming a cross-sectional shape substantially different from its unstressed shape due to the torsional forces imposed on the axle. This beam-type axle suspension system also includes a resilient pivot connection for connecting the hanger bracket to the beam, thereby allowing the brake components to be attached to the beam instead of to the axle, and having the effect of eliminating stress risers on the axle due to welding the brake components to the axle. This is achieved by the combination of a pivot connection having a resilient bushing with different deflection in the beamwise and hangerwise directions and the rigid axle-to-beam connection which maintains a constant distance between the axle and the brake components.

29 Claims, 10 Drawing Sheets

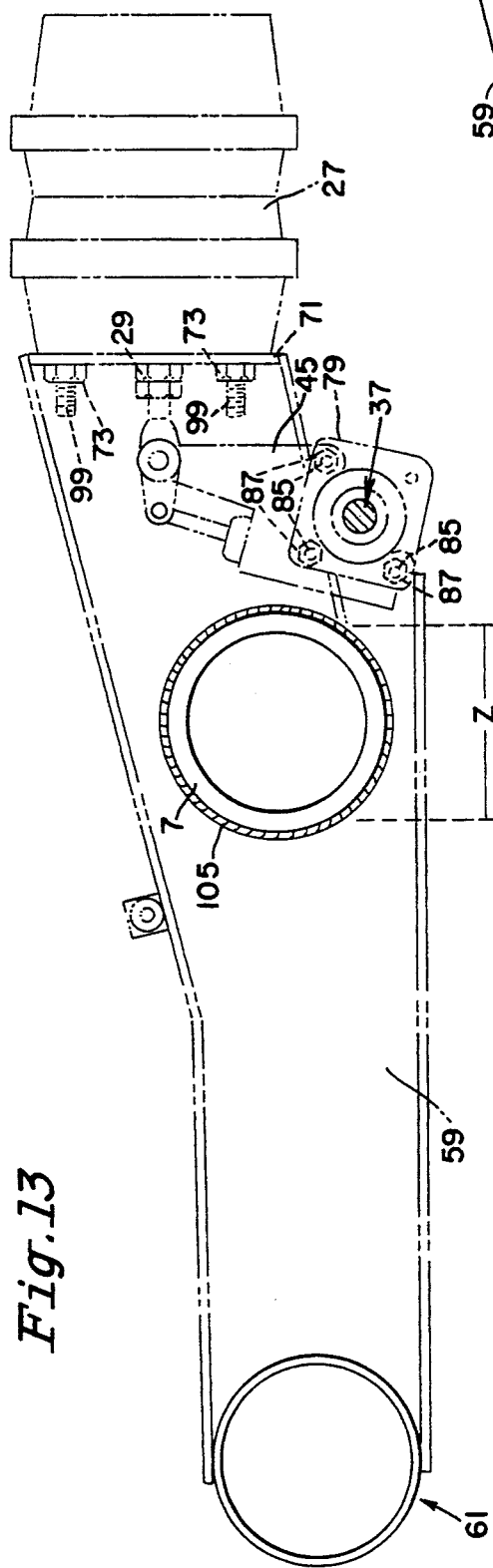
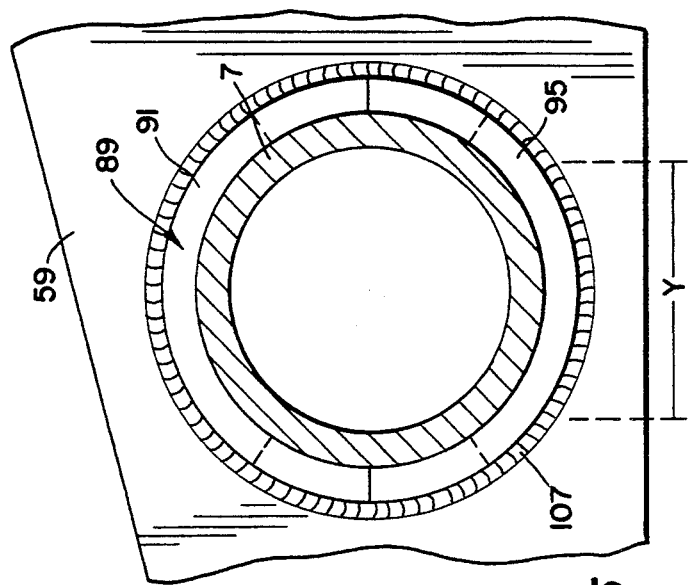
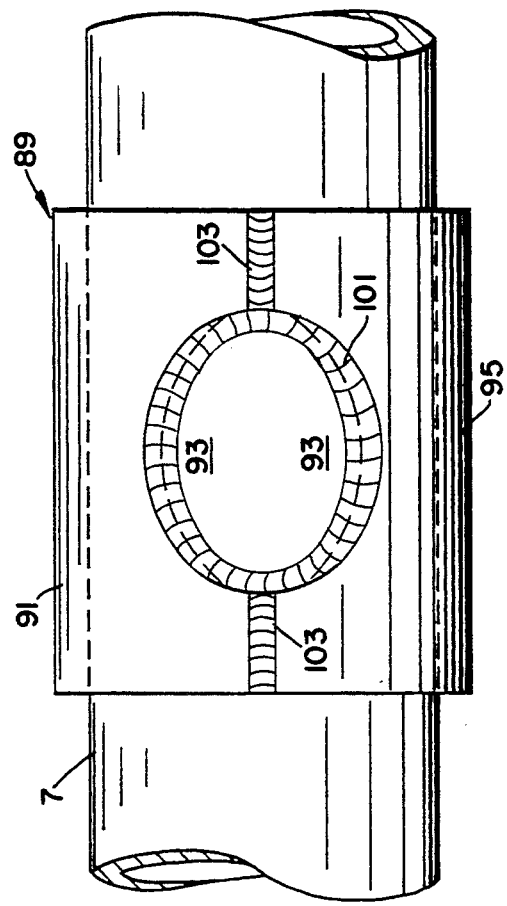
Fig.13
Fig.15
Fig.14

AXLE SUSPENSION SYSTEMS

FIELD OF THE INVENTION

This invention relates to axle suspension systems for wheeled vehicles. More particularly, this invention relates to beam-type axle suspension systems which maintain the circumferential integrity of the axle during operation. Related application: this application is a continuation of U.S. application Ser. No. 07/963,450 filed Oct. 19, 1992, now abandoned.

BACKGROUND OF THE INVENTION

The subject invention finds particular utility in the heavy duty truck and trailer industry. In this industry, the use of air brakes and air-ride beam-type suspensions has become quite popular. Such suspensions come in wide and varied forms. Generally speaking, however, they include a pair of longitudinally extending beams (flexible or rigid) one of which is located adjacent each of the two longitudinal side frame rails located underneath the body of the truck or trailer. These beams are then pivotally connected at one end to the frame hanger that is attached to the frame rail of the vehicle. Spaced along the remaining length of the beam is an air bag (bellows) and an axle. The beam may be underslung or overslung, with respect to the axle, and the air bag(s) may be located fore or aft of, or in a vertical line with, the axle. The axle may be connected to the beam rigidly or resiliently. The beam may extend in a "trailing" or a "leading" direction from its pivot, thus defining a trailing or leading beam suspension. Equivalents of air bellows, such as large rubber balls or pads or hydraulic cylinders, may be employed instead of air bags.

Prior to the advent of the invention in U.S. Pat. No. 4,166,640, the truck and trailer suspension art had not been able to successfully achieve a rigid axle-to-beam connection employing a rigid beam. In short, either the axle-to-beam connection had to be made, in some way, resilient, and/or the beam had to be made flexible, in order to successfully take up the operative articulation forces experienced during vehicle operation, even though a resilient bushing was employed at the pivotal connection (e.g. in the hanger bracket) between the beam and frame rail. By employing a sufficiently sized, resilient pivotal connection which provided a greater degree of deflection, hangerwise than beamwise, thereby to take up the operative forces at the pivot while tracking and roll-stability were maintained, the invention disclosed in the above-cited '640 patent (see FIGS. 5, 6 & 8) constituted a significant, indeed pioneer, advance in the truck and trailer suspension field. This pioneer advance occurred because, by the use of such a unique pivotal connection, there could then be used in combination with this resilient pivotal connection a rigid beam and a rigid axle-to-beam connection. In fact, in the preferred forms of this patented invention, the resilient pivotal bushing system was so designed that it took up, successfully, virtually all of the operative articulation forces during vehicle use, while the suspension as a whole meets all criteria for a very safe suspension. In addition, maintenance requirements were significantly reduced and life-expectancy dramatically increased over known suspensions employing resilient axle-to-beam connections, while at the same time, the extra weight of attendant resilient beams (e.g. leaf springs) was avoided. In some instances, in fact, the resilient bushings at the pivot outlasts the life of the vehicle.

In 1991, an important improvement in the aforesaid invention was disclosed, upon the issuance of U.S. Pat. No. 5,037,126. Employing the basic concepts in the '640 patent of a rigid axle-to-beam connection, rigid beam, and orificed resilient pivot bushing, the invention of the '126 patent included a unique rigid beam and axle connection thereto which significantly reduced the weight of the overall suspension even further.

The above two patented suspensions are ideal examples of rigid beam, trailing arm suspensions finding high acceptability in the truck and trailer industry. The pioneer inventive concept of U.S. Pat. No. 4,166,640 in this respect constitutes the preferred background from which the instant invention arises.

Examples of other resiliently bushed axle-to-beam connection suspensions employing rigid beams may be found, for example, in U.S. Pat. Nos. 3,332,701; 3,140,880; 3,482,854; 3,547,215; and 3,751,066. Examples of flexible beam-type suspensions with resilient or rigid axle-to-beam connections include U.S. Pat. Nos. 3,785,673; 3,918,738; 3,612,572, as well as the GMC Astro-Air suspension, the Dayton Air Suspension, Western Unit Air Suspensions, Hutchens Suspensions, and the Fruehauf Cargo Care and Pro-Par Suspensions, just to name a few.

Generally speaking, in trailing and leading beam-type suspensions, a rather unique problem occurs. The problem is that during operation of the vehicle, the axle may be stressed to a cross-sectional shape other than as manufactured (e.g. stressed "out-of-round", if a cylindrical axle is employed). There are two different loading conditions that cause this unique problem:

1. forces imposed on the suspension and axle during vehicle cornerings; and
2. forces imposed on the suspension during a vertical single-wheel input.

Referring to FIGS. 1 and 2, a rear view of a typical trailer, adequately illustrates these forces. Trailer 1 is formed of body 3, wheels 5, axle 7, and side frame rails 9 (the suspension is omitted for clarity).

FIG. 1 shows the forces incurred during trailer cornering. CG is the center of gravity of the vehicle. As trailer 1 is maneuvered about a corner, a centrifugal force "F" acts upon the vehicle at its center of gravity CG. The force "F" is proportional to the radius of the curve, or corner, and the vehicle's speed squared. This creates a roll moment "M" that is proportional to the height of the center of gravity off the ground and the magnitude of centrifugal force "F". Since the vehicle is in a steady state condition, the roll moment is resisted at the tire-to-road interface by an equal but opposite moment created by unloading the tire of one side of the vehicle by a force "W" and increasing the load on the opposite side tire by the same force magnitude "W".

The roll moment causes the trailer to lean as depicted in FIG. 1, and is due to tire and suspension deflections. The tire deflection is proportional to "W" and the radial spring rate of the tires. The suspension deflection is proportional to force "F", the effective roll center of the suspension, and the roll rate of the suspension.

The forces caused by this roll moment must be transferred from the vehicle body, through the suspension into the axle and on through the tires to the road surface. Transferring the loads from the suspension into the axle is much different in leading and trailing arm air suspensions than in any other type of suspension, thereby creating the previously mentioned unique problem of leading and trailing arm air suspension systems.

FIG. 2 illustrates the same trailer 1 and load configuration as in FIG. 1, except the axle, tires and part of the suspension are omitted. Elements 11 in the drawing are the hanger brackets that attach the suspension to the body of the trailer. In this case, the roll moment "M" is resisted by equal but opposite forces "S" that the suspension inputs to brackets 11. The forces "S" are similar for virtually all recognized types of suspensions. The forces "S" for brackets 11 are, of course, the same for any such suspension employed with brackets 11 (as generically illustrated).

Reference now is made to FIG. 3. FIG. 3 illustrates one side of a typical spring suspension 13 that consists of front suspension bracket 21, rear suspension bracket 22, steel spring 23, means 24 for attaching spring 23 to axle 7, and radius rod 26. The force "S", as depicted in FIG. 2, is distributed between the two suspension brackets 21 and 22, onto both ends of spring 23, then transferred through spring/axle attachment 24, and into axle 7. The resultant force transferred into axle 7 is simply the vertical force "$S_v$". If the other side of this type of suspension were shown, the loading would be the same except the vertical force would be in the opposite direction.

Another known type of suspension is illustrated in FIG. 4. Here, half of a typical walking beam suspension 15 consists of front suspension bracket 31, rear suspension bracket 32, steel spring 33, and saddle assembly 34 that pivotally attaches spring 33 to walking beam 35. Axle brackets 36 pivotally attach beam 35 to axles 7A and 7B. The force "S", as depicted in FIG. 2, is distributed between the two suspension brackets 31 and 32, onto both ends of spring 33, then transferred through saddle assembly 34 and into walking beam 35. The force is then transferred equally to axles 7A and 7B. The resultant force transferred into each of axles 7A and 7B is simply half the vertical force "S" (here illustrated as S/2). If the other side of this type of suspension were shown, the loading would be the same except vertical force "S" would be in the opposite direction.

Most known suspensions behave in the manner as those depicted in FIGS. 3 and 4, in that the forces put into the suspension to resist roll moment "M" result in forces into the axle that are vertical in nature only. The exception to this, however, is leading and trailing arm air suspensions, wherein an additional force acts upon the axle.

A typical trailing arm suspension 17 is shown in FIGS. 5,6 & 8 in this respect. It consists of suspension bracket 41 which is pivotally attached at 46 to a trailing arm beam 42 that is supported at one end by bracket 41 and at the other end by air spring 43. Beam 42 has a means of a rigid attachment 44 to axle 7. Suspension 17 further includes a typical brake actuation mechanism 19, comprising brake chamber 27, rod 29 and S-cam assembly 37, S-cam bearing 37A and slack adjuster 45. With this design, air spring 43 is designed to have a very low spring rate (i.e. force/deflection), and, therefore, it contributes very little to resisting roll moment "M". The force "S", as depicted in FIG. 2, is transferred primarily into suspension bracket 41 and then into one end of trailing arm beam 42, through rigid axle connection 44 and into axle 7. The resultant forces into axle 7 are a vertical force equal to "S" and a torsional force "T", equal to vertical force "S" multiplied by beam length "L" (i.e. $T = S \times L$).

Additionally, the axle acts as a beam element supporting the vertical loads transmitted from the tires through the axle and suspension to the vehicle frame. These loads generate a bending moment into the axle, thereby placing the bottom of the axle in tension and the top of the axle in compression. A weld on the surface in tension creates the potential for an axle life reducing stress riser.

Reference is now made to FIG. 6 which illustrates the complete trailing arm suspension 17 with wheels 5 and axle 7 attached (brake actuation mechanism 19 shown in FIG. 5 is omitted).

FIG. 6 illustrates axle 7 with trailing arm beams 42 attached to and their resultant forces on axle 7. The vertical load "S" is similar for all suspensions, but this type of leading or trailing arm suspension 17 adds an additional torsional force "T" to the axle. It is this torsional force that creates a unique design stress problem that must be overcome in the design of the trailing, or leading, arm suspensions.

While the suspensions disclosed in U.S. Pat. Nos. 4,166,640 and 5,037,126 successfully overcame this unique problem, the instant invention overcomes it in a unique and highly advantageous way, thereby constituting a still further improvement on the basic pioneer invention of the '640 patent. In this respect it should be remembered, as illustrated in FIG. 7, that the forces imposed on a suspension and, therefore, the axle, are the same for single wheel input (e.g. one dual wheel going over a curb "C", as illustrated, or one dual wheel dropping into a pothole), as they are for the case of trailer cornering, as described above with respect to FIGS. 1–6.

FIG. 5 illustrates an embodiment of the invention disclosed and claimed in above-referenced U.S. Pat. No. 5,037,126. In this suspension, and as is widely used in the prior art, U-bolts 39 are used to share in transferring torsional loads "T" caused by the trailing arm suspension into the axle. In '126, furthermore, a rigid, welded axle-to-beam connection is also used. Relatively thick axles are employed, and through proper engineering design, the axle safely accepts torsional loads "T". Nevertheless, U-bolts or similar parts are necessary, and the axle must be designed to be strong (e.g. heavy) enough to accept these forces.

It has now been discovered that virtually all previous commercially acceptable designs of leading or trailing beam suspensions, whether of the '126 or other types as exemplified by citation above, through their design which allows the axle to have transferred to it torsional loads "T", also causes the axle to change its circumferential (i.e. cross-sectional) shape (e.g. "out-of-round" if the axle is cylindrical, as illustrated in FIGS. 5–6). This is caused by inputting torsional loads at two points "M" and "N" (FIG. 5) only around the axle circumference. The U-bolts employed in previous preferred designs serve the function of significantly minimizing this change in cross-sectional shape. Not to do so could otherwise cause unacceptable stress risers at the point of constraint (e.g. at the weld of the axle to the beam). Thus, in most acceptable, known designs of the trailing or leading beam type, U-bolts become a preferred means for improving the life of the suspension and axle.

In view of the above, there exists a considerable, and long-felt need for a new trailing or leading beam suspension which achieves all of the benefits of prior designs of this type, but which also overcomes the need to employ U-bolts, while at the same time not giving rise to stress risers at the axle-to-beam connection, due to torsion and bending forces. It is a purpose of this invention to fulfill this need in the art.

Another problem in the suspension art, which existed and is now overcome by the instant invention should be discussed. The problem experienced, as partially illustrated in FIG. 5, and best illustrated in FIG. 8, was the need in prior suspensions of the leading and trailing beam type to have to attach brake actuation mechanism 19 by bracketry (e.g. 47 and 51) to the axle. Usually this necessitated welding (e.g. 49 and 53) both brake chamber brackets 51 and S-cam bearing brackets 47 by way of six bracket attachments to the axle in an area of high torsional stress. This can result at times in reduced axle life. For this reason, there exists yet another considerable and long-felt need in the art for a new suspension that would allow the safe attachment of the brake actuation mechanism to a part of the suspension other than the axle. It is a further purpose of this invention to fulfill this need in the art, as well as other needs as will become apparent to the skilled artisan, once given the following disclosure.

SUMMARY OF THE INVENTION

This invention achieves its purposes by effectively surrounding the axle at the axle-to-beam connection with a rigid connection substantially 360° around its circumference, thereby and substantially, prohibiting the axle from being stressed out of its manufactured cross-sectional shape (e.g. preventing any substantial amount of "out-of-round" from occurring if the axle is cylindrical), and eliminating the need for U-bolts in a trailing or leading beam-type suspension. In addition, by coupling this concept with the pioneer invention of the above-referenced U.S. Pat. No. 4,166,640, for the first known time in trailing or leading beam-type suspensions, the brake actuation system may be attached to the beam and not to the axle, thereby eliminating the problem of axle stress risers at the point of brake actuation mechanism welding.

In one form of the invention, then, there is provided in an axle suspension system for a wheeled vehicle wherein external forces imposed on the vehicle to which the suspension system is attached result in a torsional force being imposed on the axle, the suspension system including an elongated beam, a pneumatic bellows located on the beam, a hanger bracket located at one end of the beam, means for rigidly connecting the axle to the beam, and a pivot connection for resiliently connecting the beam to the hanger bracket, the improvement comprising: the means for rigidly connecting the axle to the beam comprising an orifice in the beam which substantially surrounds the axle and is rigidly attached thereto, thereby to prevent the axle from assuming a cross-sectional shape substantially different from its unstressed shape when the aforesaid torsional forces are imposed upon it.

In another form of the invention there is provided in an axle suspension system wherein external forces imposed on the vehicle to which the suspension system is attached result in a torsional force being imposed on the axle, the suspension system including a brake actuation mechanism comprised of a brake chamber, an S-cam, and an S-cam bearing, slack adjuster, an elongated beam, a pneumatic bellows located on the beam, a hanger bracket located at one end of the beam, means for rigidly connecting the axle to the beam, and a pivot connection for resiliently connecting the beam to the hanger bracket, the improvement comprising means located on the beam for attaching said S-cam bearing directly to the beam, and means for directly attaching the brake chamber to the beam.

In a particularly preferred embodiment of the present invention, there is provided in a beam type axle suspension system subject to both bending and torsional forces, means for rigidly connecting the axle to the beam, comprising an orifice in the beam of a larger size but substantially the same shape as the axle and through which the axle, with a sleeve rigidly attached thereto, is slid or pressed. The beam is then rigidly attached to the sleeve. The sleeve may be provided with windows at which the rigid connections to the axle may be made. These windows eliminate the need to weld the axle along the surface placed in maximum tension, the bottom surface of the axle, due to the bending moment generated by the vertical loads transmitted from the tires through the axle suspension to the vehicle frame. This maximizes axle life in bending by eliminating potential stress risers on the surface of maximum tension.

In certain preferred embodiments of this invention, either of the above two described rigid axle-to-beam connection concepts may be coupled together with the above brake component location concept in a single suspension. In particularly preferred embodiments, furthermore, the pivotal connection of beam-type axle suspensions is designed in accordance with U.S. Pat. No. 4,166,640 (FIGS. 5, 6 and 8 thereof and corresponding description). The entire disclosure of this patent is incorporated herein by reference.

This invention will now be described, with respect to certain embodiments thereof, as illustrated in the accompanying drawings, wherein:

IN THE DRAWINGS

Figure 5:
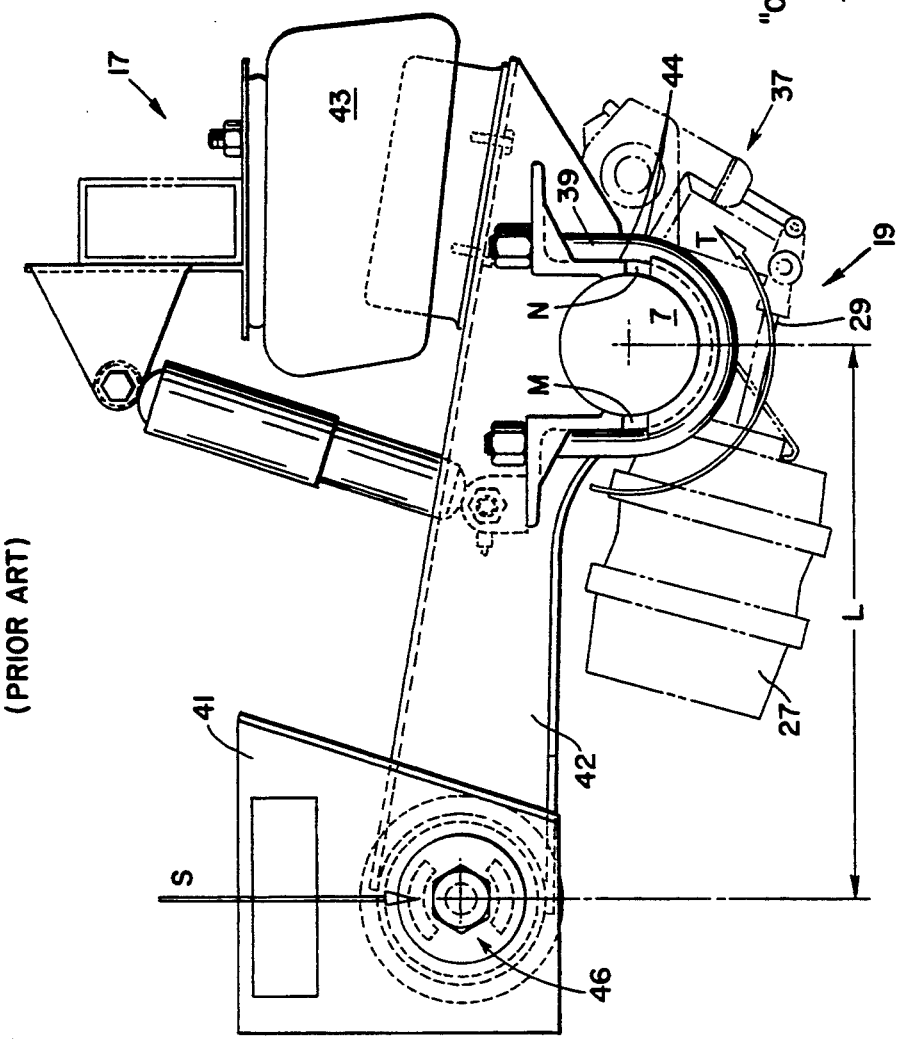

FIG. 5 is a side, partial view of an embodiment of a suspension according to U.S. Pat. No. 5,037,126.

Figure 6:
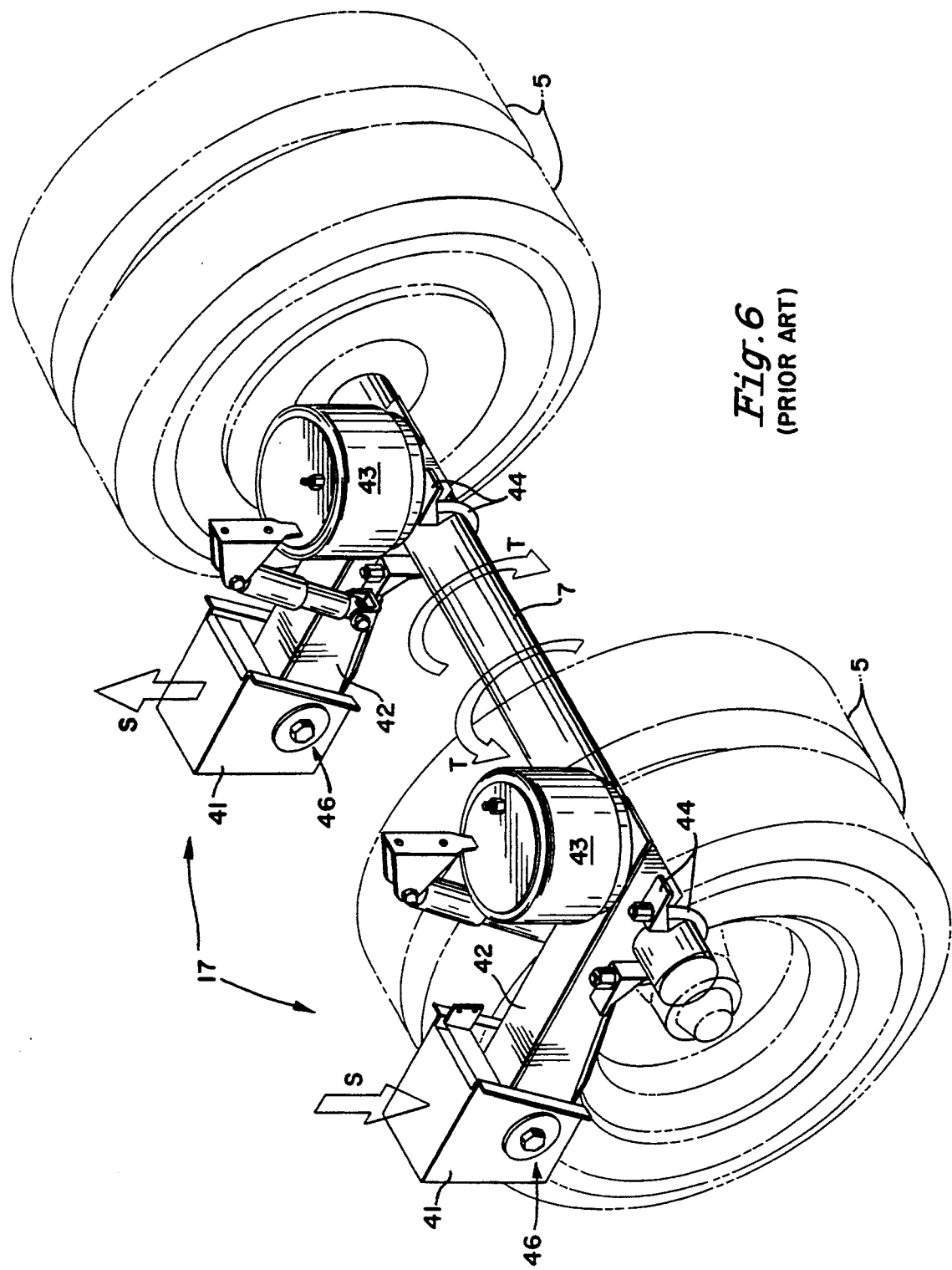

FIG. 6 is a perspective view of the complete suspension with wheels and axle of the suspension in FIG. 5.

Figure 2:
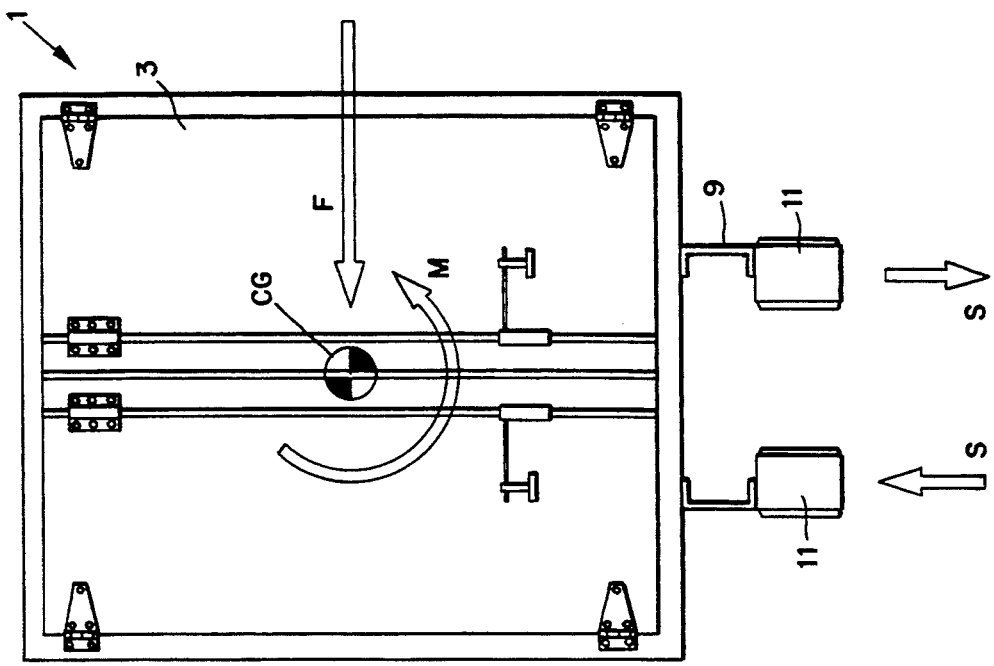
FIG. 2 is a rear schematic partial view of FIG. 1.
Figure 1:
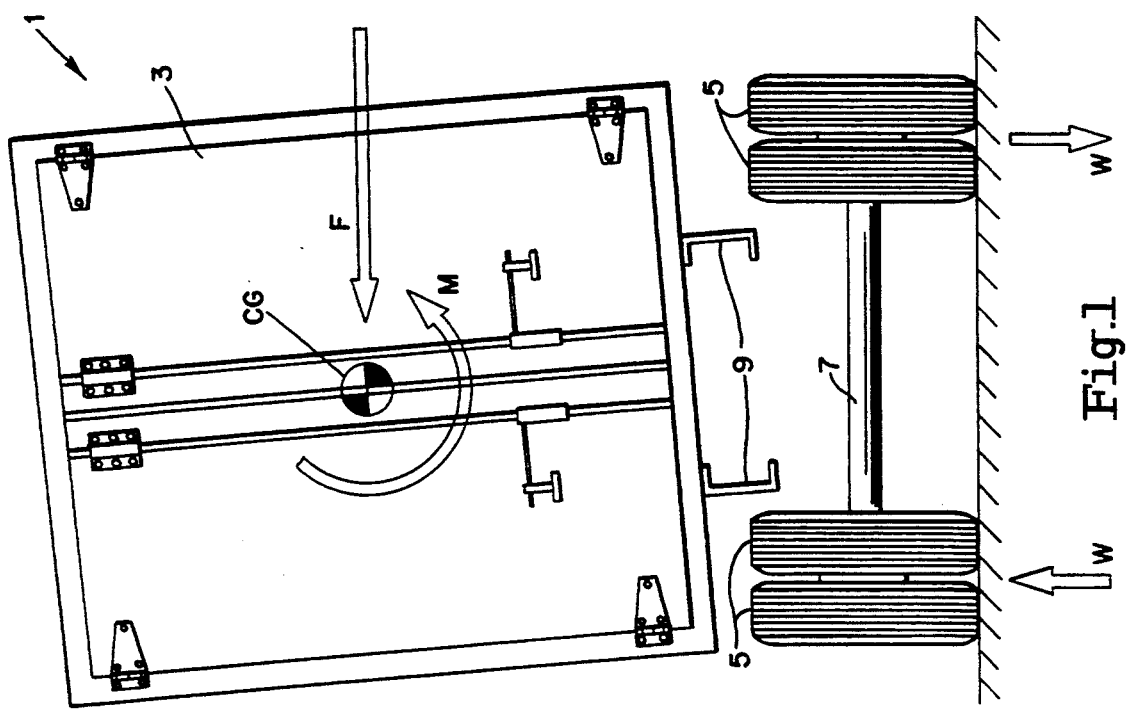
FIG. 1 is a rear schematic view of a typical trailer on which the subject invention may be employed.
Figure 3:
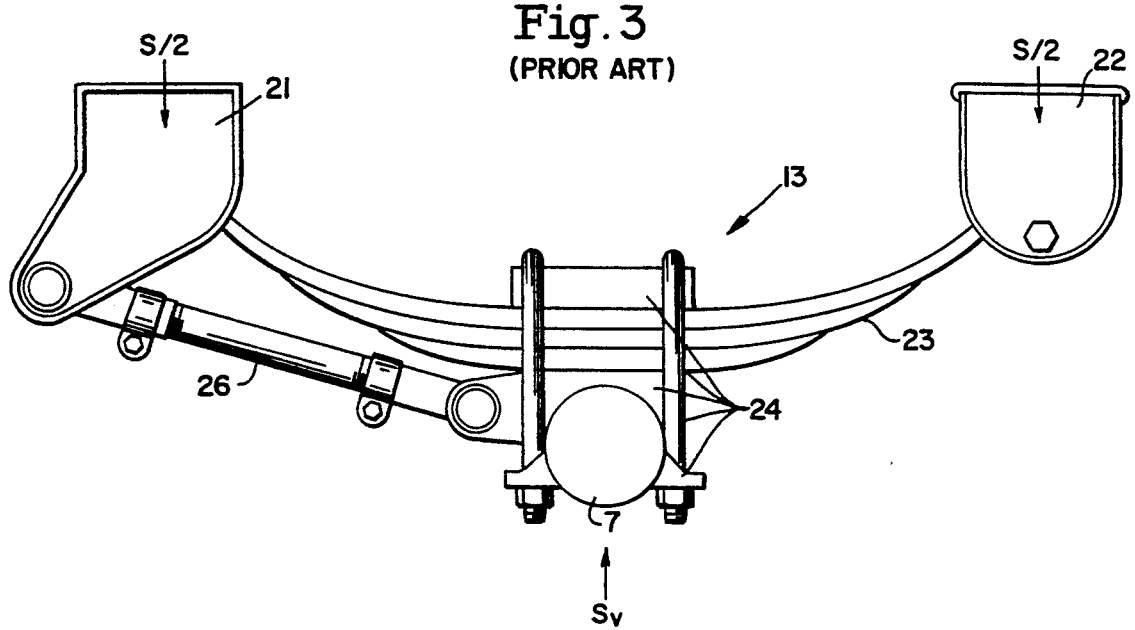
FIG. 3 is a side, partial view of a typical, known suspension.
Figure 4:
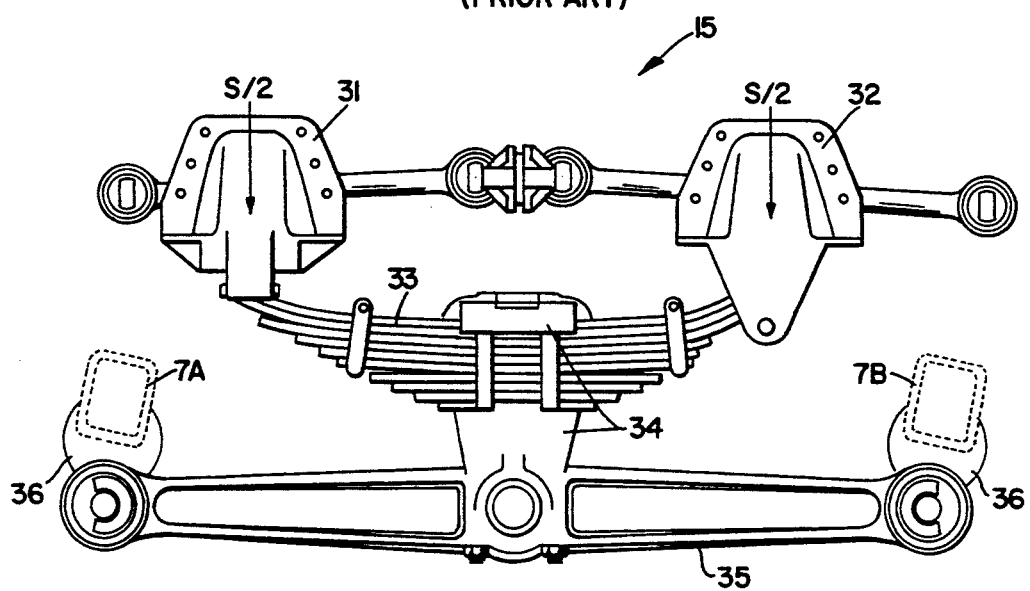
FIG. 4 is a side, partial view of another typical, known suspension.
Figure 7:
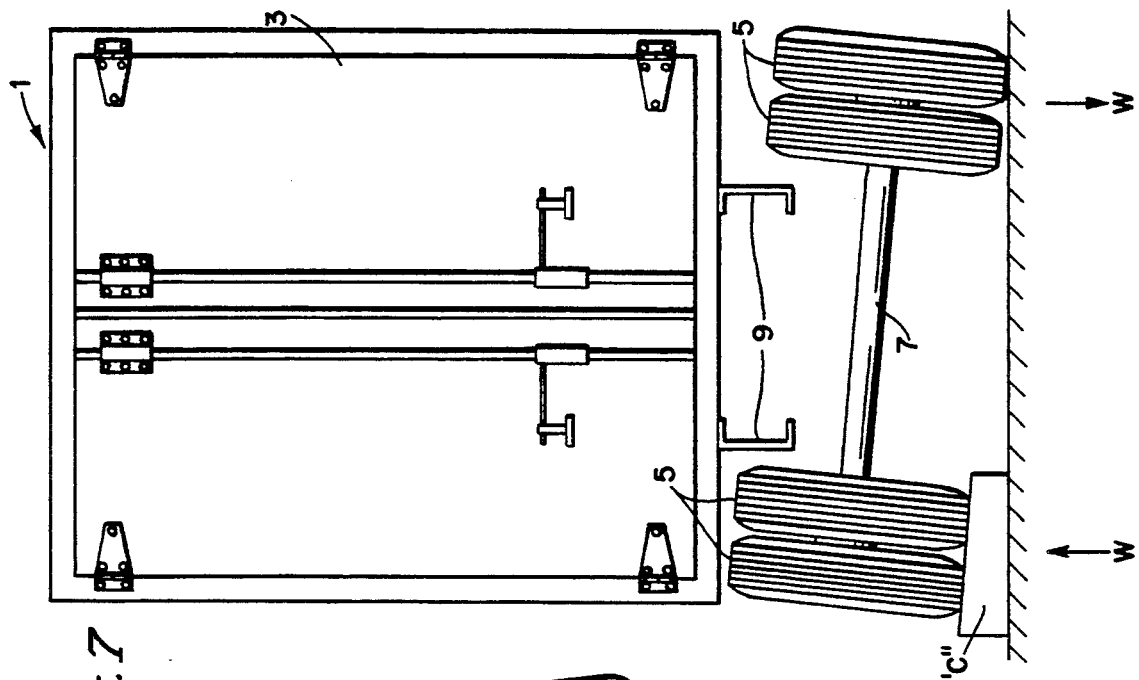

FIG. 7 is a rear schematic view of the trailer in FIG. 1, wherein the left dual wheels are on top of a curb.

Figure 8:
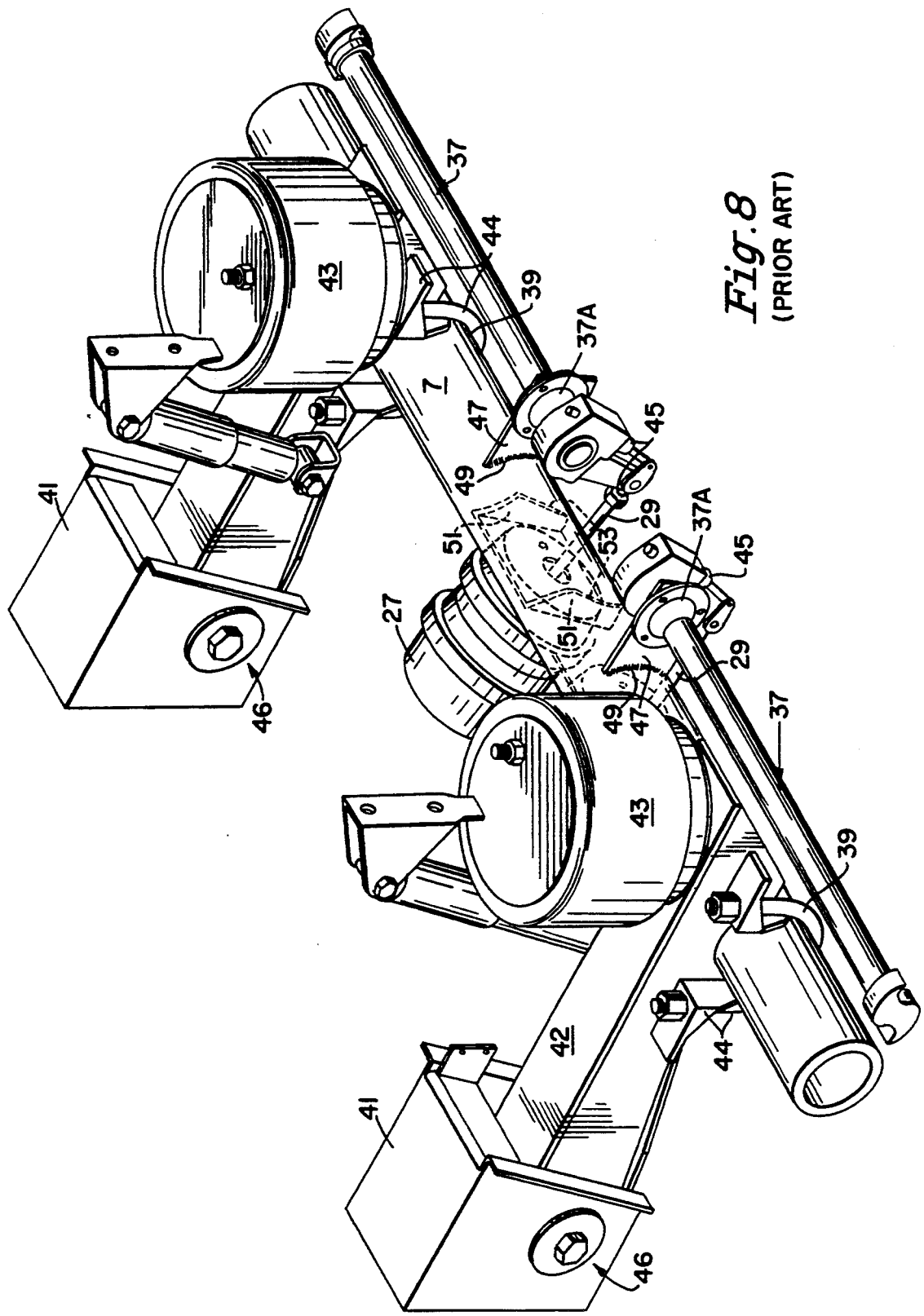

FIG. 8 is a perspective view of the suspension in FIG. 6, with the brake chambers, S-cam and slack adjusters mounted to the axle.

Figure 9:
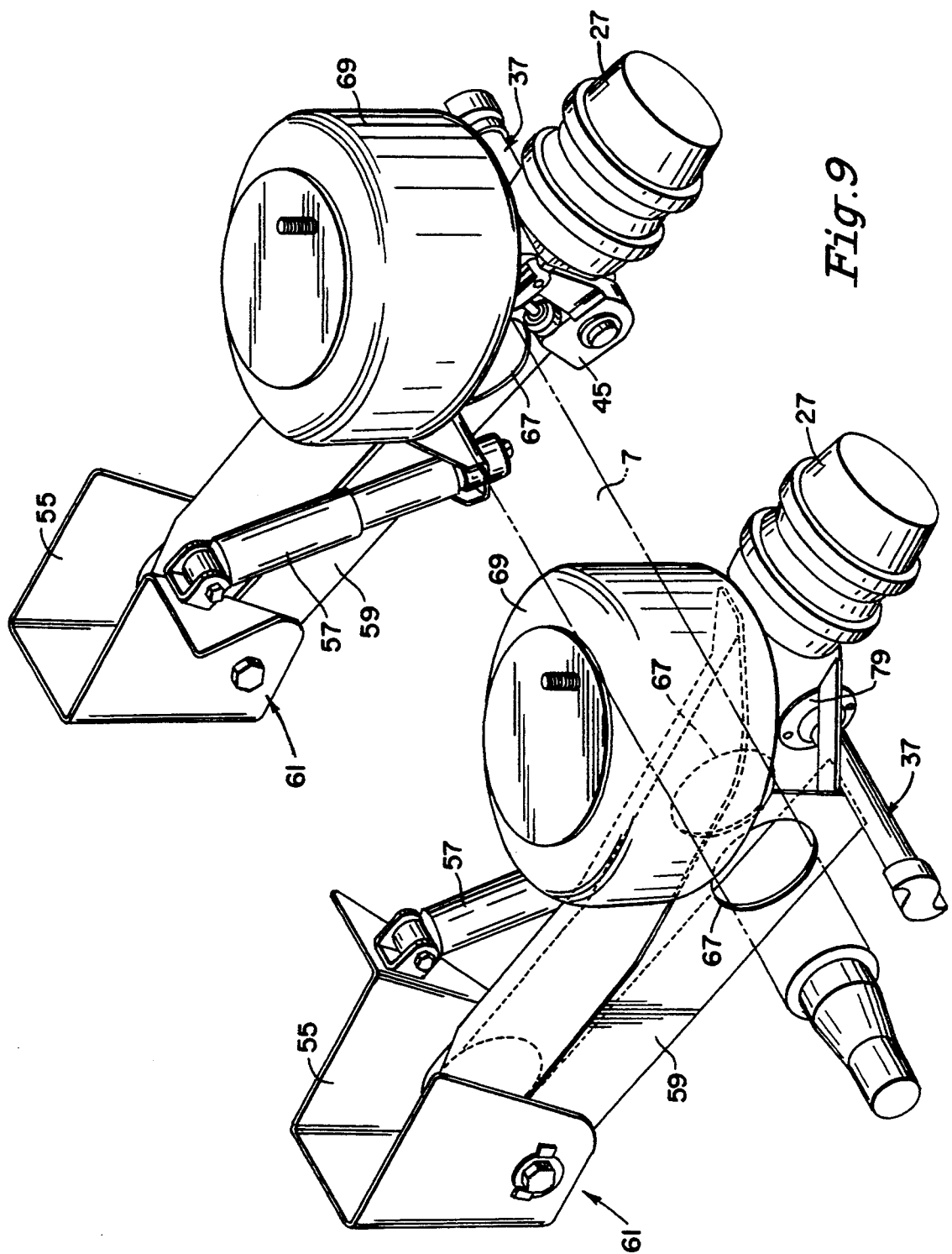

FIG. 9 is a perspective view of one embodiment of this invention.

Figure 10:
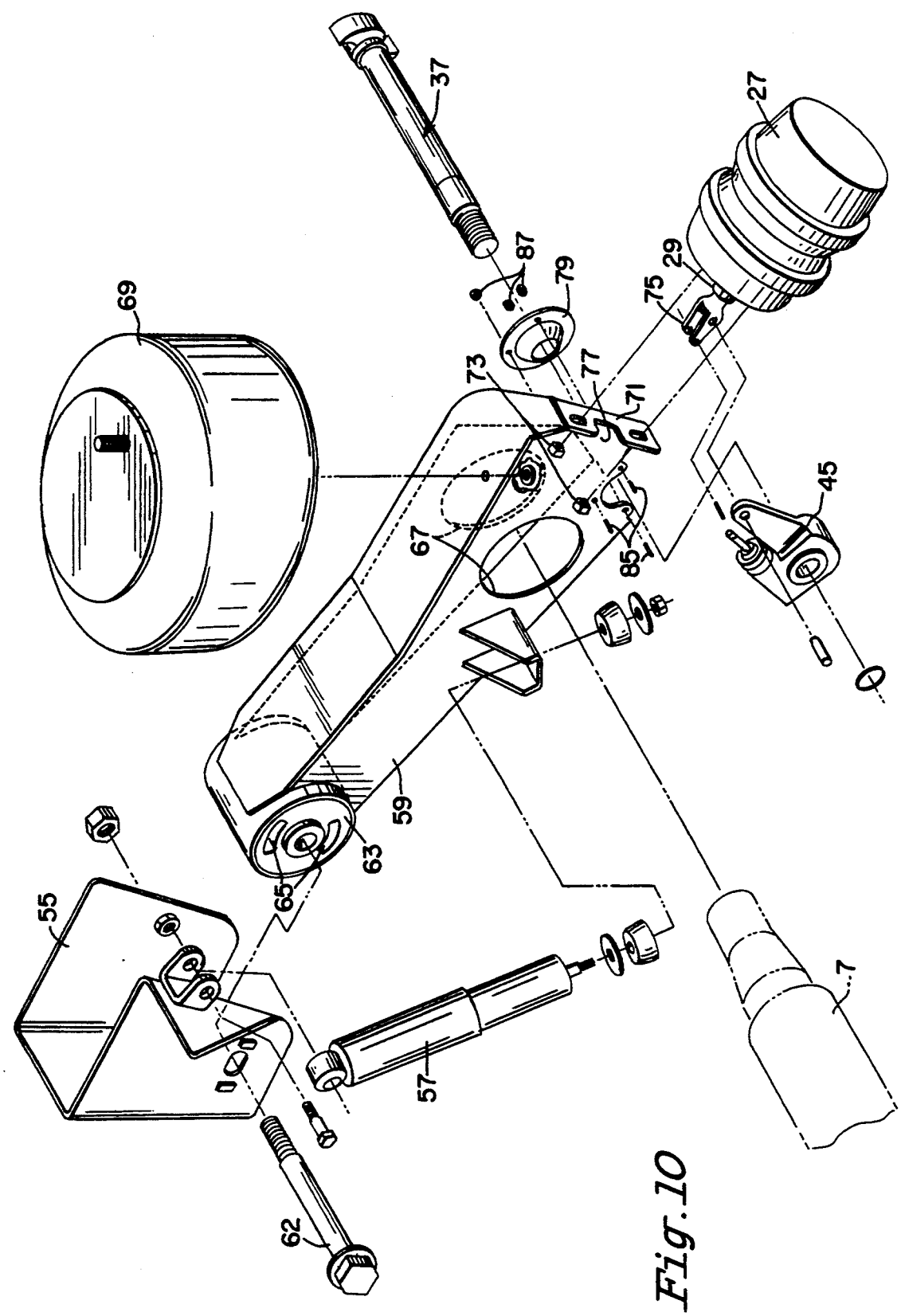

FIG. 10 is an exploded view of the embodiment of FIG. 9.

Figure 11:
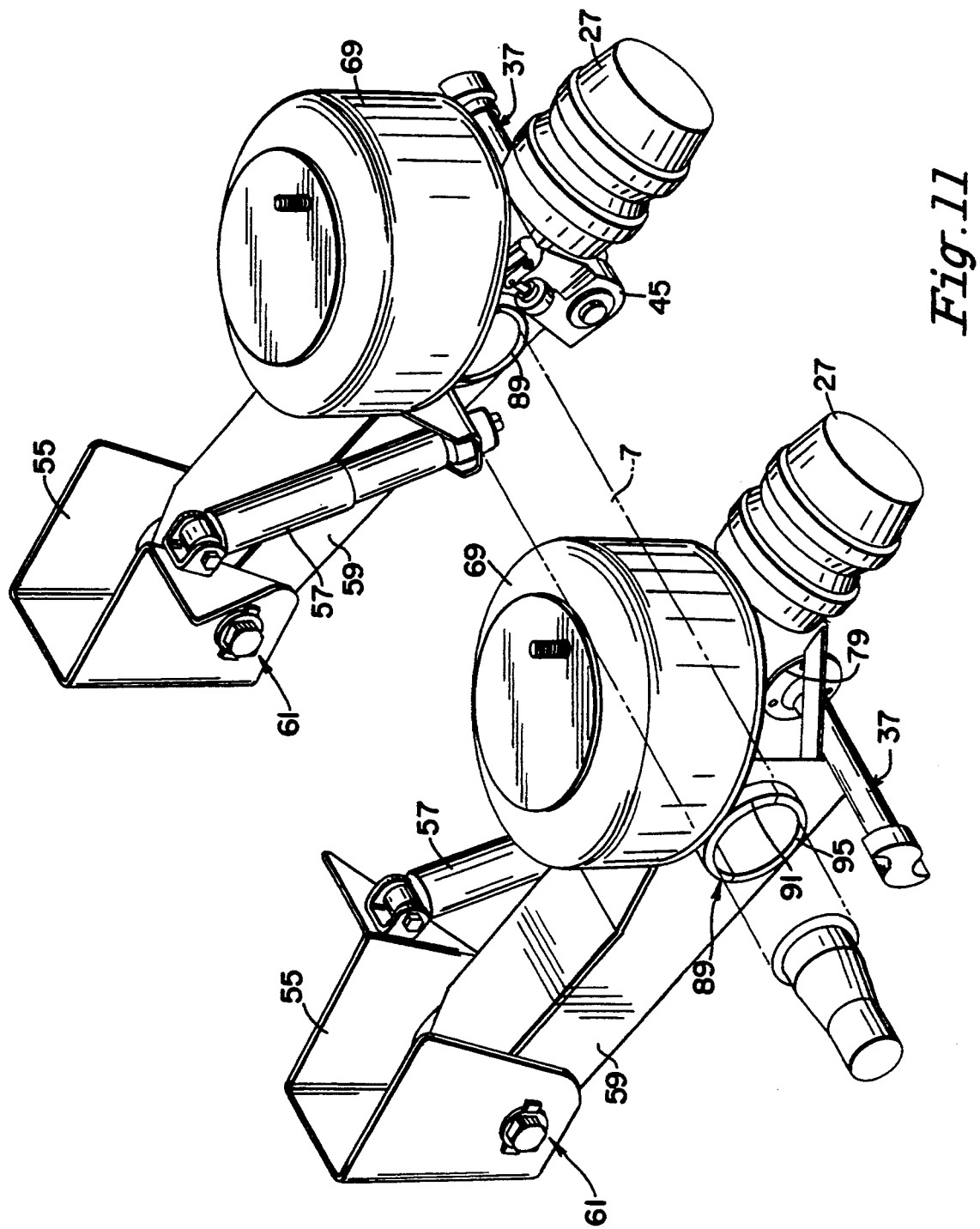

FIG. 11 is a perspective view of another embodiment of this invention.

Figure 12:
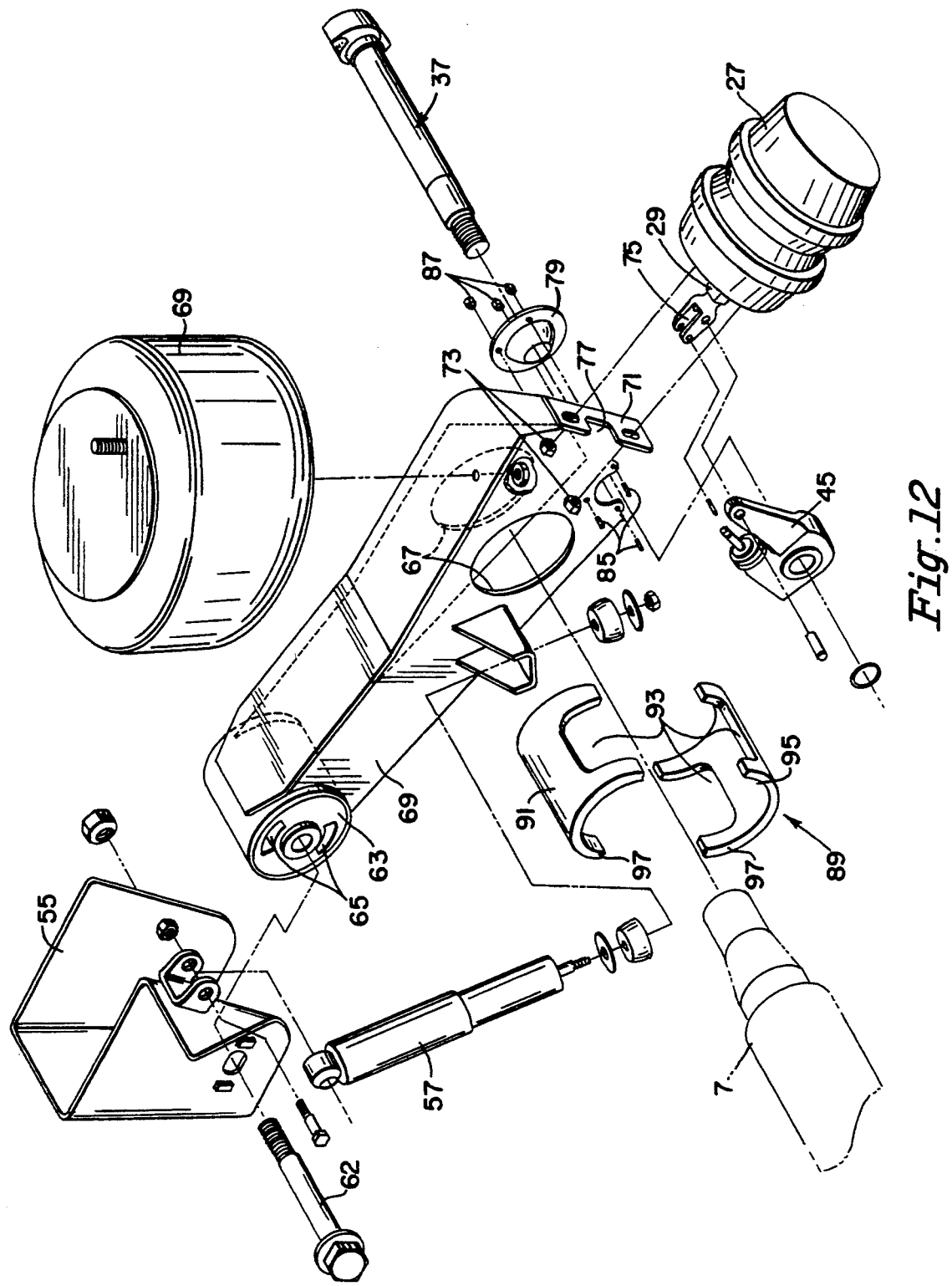

FIG. 12 is an exploded view of the embodiment of FIG. 11.

FIG. 13 is a side view of the embodiment of either of FIGS. 9 and 10.

FIG. 14 is an isolated view of the axle and sleeve shown in the embodiment of FIGS. 11 and 12.

FIG. 15 is a side partial view of the embodiment of FIGS. 11 and 12.

DETAILED DESCRIPTION OF THE INVENTION

A first embodiment of this invention is illustrated in FIGS. 9 and 10. In this embodiment there is presented a pair of each of the elements (except axle 7) for each side of the vehicle, in order to make up a complete suspension. One side of the suspension attaches in conventional fashion to one each of the pair of longitudinal frame rails of the vehicle (e.g. frame rails 9 in trailer 1, FIG. 1).

This invention finds wide application in a variety of vehicles. It is understood in this respect that any suspension environment which experiences the above-described problems, and wherein this invention may be used to solve these problems, is considered to be within the scope of this invention. As already stated, such problems are particularly apparent in the leading and trailing beam (rigid or flexible) type suspensions and, thus, this invention finds unique and advantageous applicability in such an environment. Particularly advantageous usage in this respect is in the heavy-duty truck and trailer industry, for example, in rigs known as "18-wheelers".

With further reference to FIGS. 9 and 10, the suspension illustrated includes hanger brackets 55, having shock absorbers 57 mounted thereon at one end. The other end of shock absorber 57 is mounted to the side of rigid beam 59. Rigid beam 59, in turn, is pivotally and resiliently connected at one end to hanger 55 by pivot assembly 61, which includes bolt means 62 and resilient bushing member 63. Resilient bushing 63 has orifices 65 in its end portion, as shown and described in U.S. Pat. No. 4,166,640. In fact, the entire pivot assembly 61, including resilient bushing 63, is preferably that as disclosed in the aforesaid U.S. Pat. No. 4,166,640.

Located intermediate the ends of beam 59, in its side walls are axle-confining orifices 67. As can be seen, orifices 67 are only slightly larger in cross-section than axle 7, so as to allow axle 7 to be slid or pressed therethrough. The cross-sectional shape of orifices 67, in this respect, matches that of axle 7. Thus, as illustrated, orifices 67 are round because axle 7 is cylindrical. If axle 7 were rectangular, then orifices 67 would be of a matching rectangular shape, etc.

By locating axle 7 through orifices 67 as illustrated, axle 7 is confined by beam 59. Referring to FIG. 13, axle 7 may then be rigidly attached to beam 59 merely by welding the two together with a continuous 360° weld 105 around the orifice/axle interface, to eliminate stress risers due to discontinuities. Axle 7 is, through proper engineering design, relatively thick thereby, to safely accept torsional loads. Further, the thick axle minimizes the effect of stress risers due to welding, particularly along the bottom surface, area Z shown in FIG. 13, placed in tension due to the bending moment generated by the vertical loads transmitted from the tires through the axle suspension system to the vehicle frame. When so constructed, torsional forces cannot stress axle 7 substantially out of round, and stress risers in the axle that may otherwise have occurred, are eliminated. In addition, there is no need for expensive, weighty, and maintenance-requiring U-bolts to connect the axle to the beam. A significant, long-felt need in the art is thereby met.

Bolted to the top of the beams are air bags 69 of conventional design. In addition to providing an air ride suspension, in known fashion, they also serve as the other connection of the beam to the frame rails of the vehicle (also in known fashion). Air bags 69 may be of any conventional design, and may be located at numerous places above or below the axle centerline, in accordance with known criteria for ride height, etc.

FIGS. 9, 10 and 13 illustrate yet another unique feature of the instant invention, i.e. the ability to attach the brake actuation mechanism to the beam and thereby avoid entirely any welding or other type of attachment to axle 7 between the beams, except for the rigid axle-to-beam connection. The axle-to-beam connection, as described above, is rigid. This is important. To be safe, brake chambers and S-cam assemblies must remain in the same position relative to the axle, or the brakes may not operate properly. Through the use of the unique resilient bushing arrangement of U.S. Pat. No. 4,166,640, which allows a rigid axle-to-beam construction (as well as a rigid beam), the beam now becomes a better location for attaching the brake chamber and S-cam assembly as the axle was in the prior art, because the stress risers, due to welding attachment brackets to the axle in an area of high torsional stress, are eliminated. Thus, with reference particularly to FIG. 13, it can be seen that air brake chamber 27 may be connected to rear face wall 71 of beam 59 by bolts 99 in chamber 27 and nuts 73. Additionally, S-cam bearing bracket 79 may now be connected to side wall 77 of beam 59 by bolts 85 and nuts 87 (at FIG. 10). In this way, the brake chamber and S-cam bearing are rigidly attached to the beam, and are, therefore, not welded directly to the axle, thereby eliminating the potential for stress risers which previously could occur in the axle due to welding of these brake components to the axle, yet they are maintained in constant relation to the axle because of the rigid axle-to-beam connection.

A particularly preferred embodiment of the present invention is shown in FIGS. 11, 12, 14 and 15. Elements herein employed, which are the same as those shown in FIGS. 9–10, are similarly numbered. In this embodiment there is again presented a pair of each of the elements (except axle 7) for each side of the vehicle in order to make up a complete suspension. One side of the suspension attaches in conventional fashion to one each of the pair of longitudinal frame rails of the vehicle (e.g. frame rails 9 in trailer 1 of FIG. 1).

Referring then to FIGS. 11 and 12, the suspension illustrated includes hanger brackets 55 having shock absorbers 57 mounted thereon at one end. The other ends of shock absorbers 57 are mounted to the side of rigid beam 59. Rigid beam 59, in turn, is pivotally and resiliently connected at one end to hanger 55 by pivot assembly 61 which includes bolt means 62 and resilient bushing members 63. Resilient bushing 63 has orifices 65 in its end portion, as shown and described in U.S. Pat. No. 4,166,640. In fact, entire pivot assembly 61, including resilient bushing 63, is preferably that as disclosed in aforesaid U.S. Pat. No. 4,166,640.

Located intermediate the ends of beam 59, in its side walls are axle-confining orifices 67. As can be seen, and as differs from the previous embodiment illustrated in FIGS. 9–10, orifices 67 are larger in cross-section than axle 7, so as to allow sleeve 89, which may for ease of manufacturing be made up of a top half 91 and a bottom half 95, to be fitted therethrough. Sleeve 89 reinforces axle 7 and is used wherever it is anticipated that heavier loads are to be carried or sustained by the suspension during use.

As best illustrated in FIG. 14, sleeve 89 is attached to axle 7 by welding, brazing, soldering or adhesively bonding. When the preferred process of welding is used, care must be taken not to attach the sleeve to the axle at areas of high bending stress of the axle, i.e. along the surface of the axle adjacent to face 97 of the sleeve. In the preferred embodiment, therefore, windows 93 are provided, in top sleeve portion 91 and bottom sleeve portion 95 along a line through the sleeve parallel to the longitudinal axis of the vehicle, for welding to axle 7 fore and aft of axle 7 (see FIG. 12). Referring to FIG. 15, this eliminates welding along the bottom surface, area Y of the axle, which is the area placed in maximum tension due to bending forces. FIG. 14 shows an isolated view of axle 7, with sleeve 89 rigidly attached thereto by welding 101 along the edges of windows 93. The weld is preferably continuous, eliminating any stress risers caused by interruptions of the weld. Optional weld 103 may be made at the interface between top half 91 and bottom half 95 of sleeve 89. It is also to be noted, with respect to FIG. 14 and particularly FIG. 15, that sleeve 89 is in intimate contact throughout its entire inner surface, along its entire length, with the outside surface of axle 7. Such contact has been found to maximize axle life. By making sleeve 89 of two halves, the tight fitment of sleeve 89 into full intimate contact with axle 7, as described, may be readily achieved, through such techniques as press-fitting the two halves together. Shrink-fitting may be employed using a single circular sleeve, if desired.

With sleeve 89 rigidly attached to axle 7, as described above, the axle and sleeve are slid or pressed through orifice 67 of beam 59. Referring to FIG. 15, sleeve 89 is then rigidly attached to beam 59 by welding the sleeve to the beam with a 360° weld 107 around the orifice/sleeve interface. When so constructed, the potential for stress risers in the axle, that may otherwise arise, is virtually eliminated, axle life is maximized by not welding on the bottom surface, area Y of FIG. 15, of the axle put in maximum tension due to the bending moment caused by vertical loads transmitted from the tires through the axle and the suspension to the vehicle frame, and torsional forces cannot stress axle 7 substantially out of round.

Furthermore, as in the embodiment of FIGS. 9 and 10, conventional air bags 69 are bolted to the top of beam 59, thereby providing an air ride suspension and serving as the other connection of the beam to the frame rails of the vehicle (all in known fashion). Air bags 69 may be of any conventional design, and may be located at numerous places above or below the axle centerline, in accordance with known criteria for ride height, etc.

Also illustrated in FIGS. 11 and 12 and as in the embodiment of FIGS. 9 and 10, the brake assembly, including air chamber 27 and S-cam bearing 79, may be connected to the beam, thereby avoiding entirely any welding or other type of attachment to axle 7, except for the rigid axle-to-sleeve connection. Once again, the important rigid axle-to-beam connection is maintained and, through the use of the unique resilient bushing arrangement of U.S. Pat. No. 4,166,640, which allows a rigid axle-to-beam connection (as well as a rigid beam), the beam is a better location for mounting the brake chamber and S-cam assembly as was the axle in prior art embodiments, because the relative distance between the axle and brake components is constant.

Given the above disclosure, many other features, modifications and improvements will become apparent to the skilled artisan. Such features, modifications and improvements are, therefore, considered to be a part of this invention, the scope of which is to be determined by the following claims.

We claim:

1. In an axle bearing suspension system of the leading or trailing beam type for a wheeled vehicle wherein external forces imposed on the vehicle to which said suspension system is attached, result in torsional forces being imposed on said axle such that a portion of said axle is placed in compression and a portion of said axle is placed in tension to alter the cross-sectional configuration of said axle, said suspension system including a pair of elongated beams, one of said beams being located adjacent each side of said vehicle and each spaced from the other, each said beam including a pair of side walls extending in substantially the vertical direction with respect to said vehicle, said axle being of a hollow cross-sectional configuration and extending across substantially the entire width of the vehicle and having at least one wheel located on each end thereof, a pneumatic bellows located on each said beam, a hanger bracket located on one end of each said beam for connecting said beam to a frame member of said vehicle, means for rigidly connecting said axle to each said beam, and a pivot connection for resiliently connecting said beam to said hanger bracket, the improvement comprising:

wherein said means for rigidly connecting said axle to said beam includes means for preventing said alteration of the cross-sectional configuration of said axle, comprising an orifice in each said side wall of each said beam through which said axle extends and which substantially surrounds said axle and is rigidly attached thereto, said axle extending completely through and beyond each of said orifices, whereby said axle cross-sectional configuration is prevented from assuming a cross-sectional configuration substantially different from an unaltered configuration when said torsional forces are imposed upon said axle.

2. The axle suspension system of claim 1 wherein said pivot connection for resiliently connecting said beam to said hanger bracket comprises an elastic means having a different degree of deflection beamwise than hangerwise, said elastic means being located at a spaced distance from said axle connecting means in the path of articulation forces between the beam and hanger bracket and being sufficiently resilient to allow operative deflections in response to said articulation forces, and at the same time restrain longitudinal movement sufficiently to maintain substantially constant the distance between the hanger bracket and the axle connecting means.

3. The axle suspension system of claim 2 wherein the elastic means is contiguous to the hanger bracket.

4. The axle suspension system of claim 3 wherein the elastic means has a different spring rate in the vertical than in the horizontal.

5. The axle suspension system of claim 4 wherein the hangerwise deflection of the elastic means is greater than the beamwise deflection and the spring rate in the vertical is less than in the horizontal.

6. The axle suspension system of claim 5 wherein the pivot connection for resiliently connecting the hanger bracket and the beam includes a retaining pin transverse to the direction of the elongated beam and connected to said hanger bracket, a tubular metal cylinder in which said pin non-rotatably resides and wherein said elastic means comprises an elastic tubular element, the inner surface of which is securely held to said metal cylinder such that substantially all pivotal movement about said pin is within the elastic element.

7. The axle suspension system of claim 3 wherein the pivot connection for resiliently connecting the hanger and beam includes a pivot connection attached to the hanger and said elastic means comprises an element having a different degree of deflection beamwise than hangerwise.

8. The axle suspension system of claim 7 wherein the hanger bracket comprises two transversly spaced plates and said pivot connection for resiliently connecting the beam and the hanger bracket comprises a retaining pin extending between and connected to the plates, said elastomeric element extending around said pin and being of tubular shape, said element being held securely with respect to said pin such that substantially all pivotal movement about said pin is within the elastomeric element.

9. The axle suspension system of claim 8 wherein said tubular elastomeric element is thick walled, and the face of each wall at either end of said element is provided with at least one cavity capable of providing a lesser degree of deflection beamwise than hangerwise in said element.

10. The axle suspension system of claim 9 wherein there are two cavities in each face of said elastomeric element spaced at a vertical distance from said retaining pin thereby to provide a greater degree of deflection hangerwise than beamwise and a greater spring rate in the horizontal than in the vertical direction.

11. The axle suspension system of claim 1 wherein said orifice in said beam is substantially the same size and shape as said axle, and wherein said rigid attachment of said axle to said beam is by welding.

12. The axle suspension system of claim 1, wherein the rigid attachment of said axle to said beam is by welding continuously 360° around the circumference of said axle.

13. In an axle bearing suspension system of the leading or trailing beam type for a wheeled vehicle wherein external forces imposed on the vehicle to which said suspension system is attached, result in torsional forces being imposed on said axle such that a portion of said axle is placed in compression and a portion of said axle is placed in tension thereby tending to alter the cross-sectional configuration of said axle, said suspension system including a pair of elongated beams, one of said beams being located adjacent each side of said vehicle and each spaced from the other, each said beam including a pair of side walls extending in substantially the vertical direction with respect to said vehicle, said axle extending across substantially the entire width of the vehicle and having at least one wheel located on each end thereof, a pneumatic bellows located on each said beam, a hanger bracket located on one end of each said beam for connecting said beam to a frame member of said vehicle, means for rigidly connecting said axle to each said beam, and a pivot connection for resiliently connecting said beam to said hanger bracket, the improvement comprising:

said means for rigidly connecting said axle to said beam comprising an orifice in each said side wall of each said beam through which said axle extends and which substantially surrounds said axle and is rigidly attached thereto, and further comprising sleeve means rigidly attached to and substantially surrounding said axle and wherein said orifice in said beam substantially surrounds said sleeve means and is rigidly attached thereto, said axle extending completely through and beyond each of said orifices and said sleeve means, whereby said axle cross-sectional configuration is prevented from assuming a cross-sectional configuration substantially different from an unaltered configuration when said torsional forces are imposed upon said axle.

14. The axle suspension system of claim 13 wherein said sleeve means further comprises window means, said window means having an edge for welding said sleeve means to said axle, such that when said axle is connected to said sleeve means by welding along said edge, and no other, there exists no weld at a location where said axle is placed in maximum tension by operative bending forces.

15. The axle suspension system of claim 13, wherein said weld is continuous.

16. In an axle bearing suspension system for a wheeled vehicle wherein external forces imposed on the vehicle to which said suspension system is attached result in torsional forces being imposed on said axle, said suspension system including a brake actuation mechanism comprised of a brake chamber, an S-cam assembly comprising an S-cam bearing, a slack adjuster, an elongated beam, a pneumatic bellows located on said beam, a hanger bracket located at one end of said beam, means for rigidly connecting said axle to said beam, and a pivot connection for resiliently connecting said beam to said hanger bracket, the improvement comprising:

means located on said beam for attaching said S-cam bearing directly to said beam, and means for directly attaching said brake chamber to said beam.

17. The suspension system of claim 16 wherein said means for rigidly connecting said axle to said beam comprises an orifice in said beam which substantially surrounds said axle and is rigidly attached thereto, thereby to prevent said axle from assuming a cross-sectional shape substantially different from its unstressed shape when said torsional forces are imposed upon it.

18. The axle suspension system of claim 17 further comprising sleeve means rigidly attached to and substantially surrounding said axle, and wherein said orifice in said beam substantially surrounds said sleeve means and is rigidly attached thereto.

19. The axle suspension system of claim 18 wherein said sleeve means further comprises window means, said window means having an edge for welding said sleeve means to said axle, such that when the axle is connected to said sleeve means by welding along said edge, and no other, there exists no weld at a location where said axle is placed in maximum tension by operative bending forces.

20. The axle suspension system of claim 18, wherein said rigid attachment of said beam to said sleeve means is by continuously welding 360° about said sleeve means.

21. The axle suspension system of claim 16 wherein said pivot connection for resiliently connecting said beam to said hanger bracket comprises an elastic means having a different degree of deflection beamwise than hangerwise, said elastic means being located at a spaced distance from said axle connecting means in the path of articulation forces between the beam and hanger bracket and being sufficiently resilient to allow operative deflections in response to said articulation forces and at the same time restrain longitudinal movement sufficiently to maintain substantially constant the distance between the hanger bracket and the axle connecting means.

22. The axle suspension system of claim 21 wherein the elastic means is contiguous to the hanger bracket.

23. The axle suspension system of claim 22 wherein the elastic means has a different spring rate in the vertical than in the horizontal.

24. The axle suspension system of claim 23 wherein the hangerwise deflection of the elastic means is greater than the beamwise deflection and the spring rate in the vertical is less than in the horizontal.

25. The axle suspension system of claim 24 wherein the pivot connection for resiliently connecting the hanger bracket and the beam includes a retaining pin transverse to the direction of the elongated beam and connected to said hanger bracket, a tubular metal cylinder in which said pin non-rotatably resides and wherein said elastic means comprises an elastic tubular element, the inner surface of which is securely held to said metal cylinder such that substantially all pivotal movement about said pin is within the elastic element.

26. The axle suspension system of claim 22 wherein the pivot connection for resiliently connecting the hanger and beam includes a pivot connection attached to the hanger and said elastic means comprises an element having a different degree of deflection beamwise than hangerwise.

27. The axle suspension system of claim 26 wherein the hanger bracket comprises two transversely spaced plates and said pivot connection for resiliently connecting the beam and the hanger bracket comprises a retaining pin extending between and connected to the plates, said elastomeric element extending around said pin and being of tubular shape, said element being held securely with respect to said pin such that substantially all pivotal movement about said pin is within the elastomeric element.

28. The axle suspension system of claim 27 wherein said tubular elastomeric element is thick walled, and the face of each wall at either end of said element is provided with at least one cavity capable of providing a lesser degree of deflection beamwise than hangerwise in said element.

29. The axle suspension system of claim 28 wherein there are two cavities in each face of said elastomeric element spaced at a vertical distance from said retaining pin thereby to provide a greater degree of deflection hangerwise than beamwise and a greater spring rate in the horizontal than in the vertical direction.

* * * * *

UNITED STATES PATENT AND TRADEMARK OFFICE
CERTIFICATE OF CORRECTION

PATENT NO.   : 5,366,237
DATED        : November 22, 1994
INVENTOR(S)  : Dilling et al.

It is certified that error appears in the above-identified patent and that said Letters Patent is hereby corrected as shown below:

Column 12,
Line 20, delete "of claim 13", and insert -- of claim 14 --.

Signed and Sealed this

Eleventh Day of November, 2003

JAMES E. ROGAN
*Director of the United States Patent and Trademark Office*

US005366237C1

(12) REEXAMINATION CERTIFICATE (4765th)
United States Patent
Dilling et al.

(10) Number: US 5,366,237 C1
(45) Certificate Issued: Apr. 15, 2003

(54) AXLE SUSPENSION SYSTEMS

(75) Inventors: Scott Dilling, Canton, OH (US); Michael J. Keeler, Canton, OH (US); John Ramsey, Canton, OH (US); Joseph M. Ross, North Canton, OH (US)

(73) Assignee: The Boler Company, Itasca, IL (US)

Reexamination Request:
No. 90/006,054, Jul. 5, 2001

Reexamination Certificate for:
Patent No.: 5,366,237
Issued: Nov. 22, 1994
Appl. No.: 08/230,136
Filed: Apr. 20, 1994

Related U.S. Application Data

(63) Continuation of application No. 07/963,450, filed on Oct. 19, 1992, now abandoned.

(51) Int. Cl.[7] .................................................. B60G 9/02

(52) U.S. Cl. .......................... 280/124.116; 280/124.157

(58) Field of Search .................... 280/124.116, 124.156, 280/124.157, 124.165, 683

(56) References Cited

PUBLICATIONS

Hendrickson Turner/Turner Suspensions, Inc./The Boler Company Model TDC Marketing Documents Jul. 1, 1986 and Dec. 1987, 7 Sheets, Canton, Ohio.

*Primary Examiner*—Paul N. Dickson

(57) ABSTRACT

A beam-type axle suspension system particularly applicable to trailers and which is subject to torsional forces includes an elongated beam, a pneumatic bellows located on the beam, a hanger bracket located at one end of the beam, a connection for rigidly connecting the beam to the axle and a resilient pivot connection for resiliently connecting the beam to the hanger bracket wherein the beam includes an orifice through which the axle is slid or pressed and rigidly attached thereto, thereby preventing the axle from assuming a cross-sectional shape substantially different from its unstressed shape due to the torsional forces imposed on the axle. This beam-type axle suspension system also includes a resilient pivot connection for connecting the hanger bracket to the beam, thereby allowing the brake components to be attached to the beam instead of to the axle, and having the effect of eliminating stress risers on the axle due to welding the brake components to the axle. This is achieved by the combination of a pivot connection having a resilient bushing with different deflection in the beamwise and hangerwise directions and the rigid axle-to-beam connection which maintains a constant distance between the axle and the brake components.

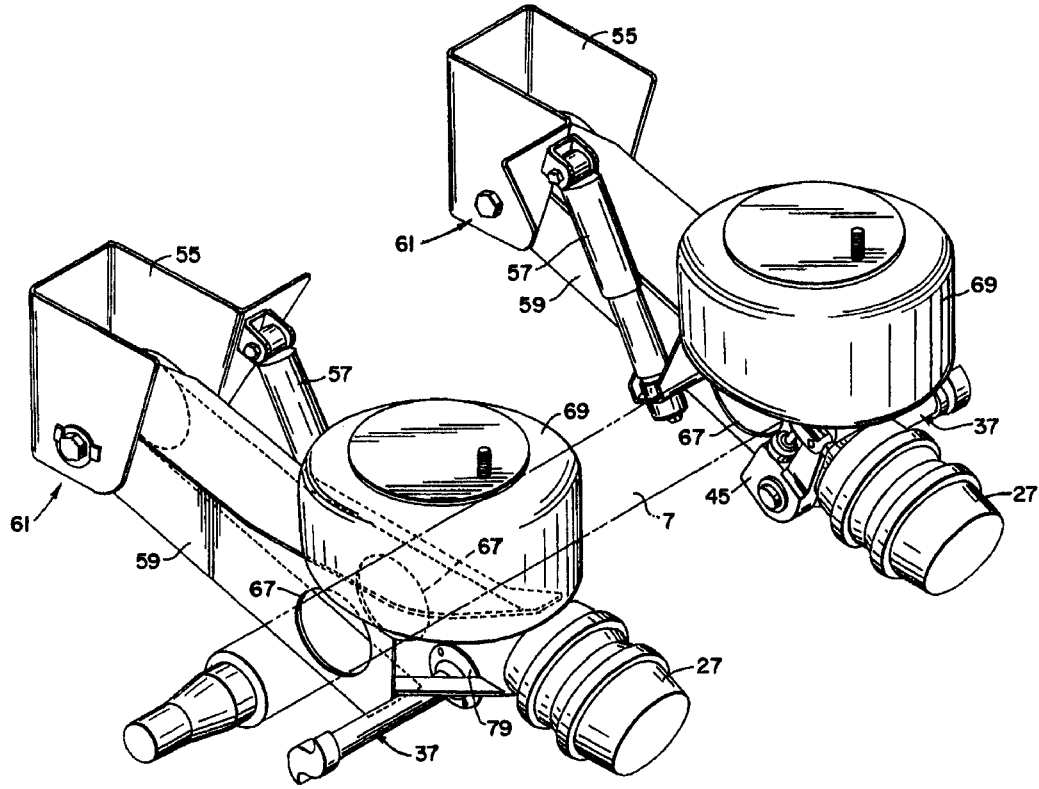

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–29 is confirmed.

* * * * *